(12) United States Patent
Hulbert et al.

(10) Patent No.: US 11,041,063 B2
(45) Date of Patent: Jun. 22, 2021

(54) LONG-TERM FIRE RETARDANT WITH AN ORGANOPHOSPHATE AND METHODS FOR MAKING AND USING SAME

(71) Applicant: FRS Group, LLC, Carnelian Bay, CA (US)

(72) Inventors: Dennis Hulbert, Grass Valley, CA (US); Robert J. Burnham, Incline Village, NV (US); Michael S. Schnarr, Sonora, CA (US); Gerald Geissler, Roseville, CA (US); David W. Wilkening, Ronan, MT (US); Joseph McLellan, Quincy, MA (US)

(73) Assignee: FRS Group, LLC, Rocklin, CA (US)

( * ) Notice: Subject to any disclaimer, the term of this patent is extended or adjusted under 35 U.S.C. 154(b) by 0 days.

(21) Appl. No.: 17/031,024

(22) Filed: Sep. 24, 2020

(65) Prior Publication Data

US 2021/0009787 A1    Jan. 14, 2021

Related U.S. Application Data

(63) Continuation of application No. PCT/US2020/036367, filed on Jun. 5, 2020.
(Continued)

(51) Int. Cl.
*A62D 1/00* (2006.01)
*C08K 5/523* (2006.01)
(Continued)

(52) U.S. Cl.
CPC .............. *C08K 5/523* (2013.01); *C08K 3/016* (2018.01); *C08K 3/22* (2013.01); *C08K 5/0066* (2013.01);
(Continued)

(58) Field of Classification Search
CPC ...... A62D 1/00; A62D 1/0042; A62D 1/0007; A62D 1/0028; A62C 3/0028; A62C 3/02;
(Continued)

(56) References Cited

U.S. PATENT DOCUMENTS

| 2,759,924 A | 8/1956 | Touey |
| 2,990,233 A * | 6/1961 | Pacsu ................... D06M 13/35 |
| | | 8/189 |

(Continued)

FOREIGN PATENT DOCUMENTS

| AU | 2018435573 A1 | 3/2021 |
| CN | 1225344 A | 8/1999 |

(Continued)

OTHER PUBLICATIONS

Byrd et al., "Characterizing short-wave infrared fluorescence of conventional near-infrared fluorophores." Journal of biomedical optics 24.3 (2019): 035004. 6 pages.

(Continued)

*Primary Examiner* — Jane L Stanley
(74) *Attorney, Agent, or Firm* — Smith Baluch LLP (57) ABSTRACT

A forest fire retardant composition is substantially free of ammonium and includes an organophosphate derived from (i) a phosphorylation agent and (ii) an organic molecule comprising at least two hydroxyl groups. The organophosphate may contain at least one phosphate ester bonded to an organic molecule, wherein the organic molecule comprises at least one monomer unit of about 2 to 40 carbon atoms. Preferably, at least 90% of the functional groups of the organophosphate is a phosphate ester group. The composition may also include a salt, including magnesium salt and/or calcium salt. The anion in the salt may be hydroxide, carbonate or phosphate. The salt may be an anhydrous salt, a salt hydrate, or a combination of both. The composition is (Continued)

effective in suppressing, retarding, and controlling forest fires while exhibiting corrosion resistance and low toxicity.

28 Claims, 2 Drawing Sheets

Related U.S. Application Data (60) Provisional application No. 63/028,765, filed on May 22, 2020, provisional application No. 63/024,040, filed on May 13, 2020, provisional application No. 62/989,350, filed on Mar. 13, 2020, provisional application No. 62/858,640, filed on Jun. 7, 2019.

(51) Int. Cl.

| | | |
|---|---|---|
| *C08K 5/00* | (2006.01) | |
| *C08K 3/016* | (2018.01) | |
| *C08K 5/17* | (2006.01) | |
| *C08L 101/00* | (2006.01) | |
| *C08K 3/22* | (2006.01) | |
| *C09K 21/02* | (2006.01) | |
| *A62C 3/02* | (2006.01) | |
| *A62C 5/00* | (2006.01) | |

(52) U.S. Cl.
CPC .............. *C08K 5/17* (2013.01); *C08L 101/00* (2013.01); *C09K 21/02* (2013.01); *A62C 3/02* (2013.01); *A62C 5/00* (2013.01); *A62D 1/00* (2013.01); *A62D 1/0028* (2013.01); *A62D 1/0042* (2013.01); *C08K 2003/2241* (2013.01); *C08L 2201/02* (2013.01)

(58) Field of Classification Search
CPC .......... A62C 5/00; A62C 5/002; C08K 5/523; C08K 5/52; C08K 5/51; C08K 5/0066; C08K 3/016; C08K 3/22; C08K 2003/162; C08K 2003/166; C08K 2003/2217; C08K 2003/2206; C08K 2003/2241; C08K 2003/265; C08K 2003/267; C08K 2003/326; C08K 2003/325; C08K 13/02; C08K 13/08; C09K 21/00; C09K 21/02; C09K 21/12; C09K 21/14; C08L 101/00; C08L 2201/02

See application file for complete search history.

(56) References Cited

U.S. PATENT DOCUMENTS

| | | | |
|---|---|---|---|
| 3,409,550 A * | 11/1968 | Gould | A62D 1/0035 252/602 |
| 3,585,135 A | 6/1971 | Smith et al. | |
| 3,843,525 A | 10/1974 | Hattori et al. | |
| 4,134,876 A * | 1/1979 | Horner | C08K 5/523 524/127 |
| 4,134,959 A | 1/1979 | Menke et al. | |
| 4,145,296 A | 3/1979 | Fox et al. | |
| 4,168,239 A * | 9/1979 | Mertz | A62D 1/005 252/2 |
| 4,343,854 A * | 8/1982 | Moorman | C09K 21/08 428/95 |
| 4,392,994 A * | 7/1983 | Wagener | C09K 15/32 252/602 |
| 4,950,410 A | 8/1990 | Pennartz | |
| 4,983,326 A | 1/1991 | Vandersall | |
| 5,009,710 A * | 4/1991 | Bewsey | C05G 5/20 106/205.9 |
| 5,596,029 A | 1/1997 | Goebelbecker et al. | |
| 5,849,210 A | 12/1998 | Pascente et al. | |
| 5,985,013 A | 11/1999 | Kofler et al. | |
| 6,019,176 A | 2/2000 | Crouch | |
| 6,296,781 B1 * | 10/2001 | Amiran | A62D 1/0042 252/2 |
| 6,447,697 B1 | 9/2002 | Vandersall | |
| 6,517,747 B2 | 2/2003 | Vandersall | |
| 6,802,994 B1 | 10/2004 | Kegeler et al. | |
| 6,858,567 B2 | 2/2005 | Akao | |
| 7,115,677 B2 | 10/2006 | Harashina et al. | |
| 7,794,688 B2 | 9/2010 | Caine et al. | |
| 8,212,073 B2 * | 7/2012 | Kasowski | C09K 21/12 564/12 |
| 9,919,174 B2 * | 3/2018 | Vellmar | A62D 1/0035 |
| 9,982,195 B2 | 5/2018 | Matsui | |
| 10,550,483 B2 | 2/2020 | Khosla et al. | |
| 10,590,257 B2 | 3/2020 | Appel et al. | |
| 10,752,840 B2 | 8/2020 | Cha et al. | |
| 10,960,249 B2 | 3/2021 | Hulbert et al. | |
| 10,960,250 B2 | 3/2021 | Hulbert et al. | |
| 10,960,251 B1 | 3/2021 | Hulbert et al. | |
| 2002/0013403 A1 | 1/2002 | Vandersall | |
| 2003/0010507 A1 | 1/2003 | Greiner et al. | |
| 2004/0074650 A1 * | 4/2004 | Shiga | A62D 1/0071 169/5 |
| 2005/0001197 A1 * | 1/2005 | Clark | A62D 1/0042 252/3 |
| 2008/0196908 A1 | 8/2008 | Schaefer | |
| 2010/0063180 A1 * | 3/2010 | Kang | A62D 1/005 523/337 |
| 2011/0089386 A1 | 4/2011 | Berry et al. | |
| 2011/0105649 A1 * | 5/2011 | Harada | C08L 101/16 524/30 |
| 2011/0213065 A1 | 9/2011 | Giesselbach et al. | |
| 2012/0219947 A1 | 8/2012 | Yurkovetsky et al. | |
| 2012/0292551 A1 * | 11/2012 | Klaffmo | C07F 9/4407 252/2 |
| 2013/0180738 A1 | 7/2013 | Kim et al. | |
| 2013/0264509 A1 * | 10/2013 | Shalev | A62D 1/005 252/2 |
| 2016/0030789 A1 | 2/2016 | Cordani | |
| 2016/0264687 A1 | 9/2016 | Tran | |
| 2017/0056698 A1 | 3/2017 | Pai et al. | |
| 2018/0282218 A1 | 10/2018 | Mabey | |
| 2019/0153321 A1 | 5/2019 | Simonovic | |
| 2020/0109253 A1 | 4/2020 | Appel et al. | |
| 2020/0384298 A1 | 12/2020 | Hulbert et al. | |
| 2020/0384299 A1 | 12/2020 | Hulbert et al. | |
| 2021/0009787 A1 | 1/2021 | Hulbert et al. | |

FOREIGN PATENT DOCUMENTS

| | | |
|---|---|---|
| CN | 1446993 A | 10/2003 |
| CN | 102417196 A | 4/2012 |
| CN | 107880857 A | 4/2018 |
| CN | 112391176 A | 2/2021 |
| WO | 2006132568 A2 | 12/2006 |
| WO | 2010059508 A1 | 5/2010 |
| WO | 2020247775 A2 | 12/2020 |
| WO | 2020247780 A1 | 12/2020 |

OTHER PUBLICATIONS

Cellulose. Wikipedia Dec. 6, 2018. Accessed at https://en.wikipedia.org/w/index.php? title=Cellulose&oldid=872356598 on Aug. 19, 2020. 12 pages.
Ding et al., "Recent advances in near-infrared II fluorophores for multifunctional biomedical imaging." Chemical science 9.19 (2018): 4370-4380.
Ecological Risk Assessment of Wildland Fire-Fighting Chemicals: Long-Term Fire Retardants. United States Forest Service Sep. 2017. Accessed at https://www.fs.fed.us/rm/fire/wfcs/documents/EcoRA-Retardants-ExecSummary_2017.pdf. 3 pages.
Evaluation of Wildland Fire Chemicals Standard Test Procedures STP 1.5—Fish Toxicity. USFS May 7, 2007. Accessed at https://www.fs.fed.us/rm/fire/wfcs/tests/documents/stp_01_5_pdf. 2 pages.
Fish Toxicity. US Forest Service Revised Sep. 6, 2017. Accessed at (56) References Cited

OTHER PUBLICATIONS https://www.fs.fed.us/rm/fire/wfcs/performance/documents/FishTox_Foam.pdf. 2 pages.

Fiss et al., "Mechanochemical phosphorylation of polymers and synthesis of flame-retardant cellulose nanocrystals." ACS Sustainable Chemistry & Engineering 7.8 (2019): 7951-7959.

Hobbs, "Recent advances in bio-based flame retardant additives for synthetic polymeric materials." Polymers 11.2 (2019):224. 31 pages.

Hollingbery et al., "The fire retardant behaviour of huntite and hydromagnesite—A review." Polymer degradation and stability 95.12 (2010): 2213-2225.

International Search Report and Written Opinion in International Patent Application No. PCT/US2020/036367 dated Sep. 9, 2020, 23 pages.

Qu et al., "The synergism of $MgCO_3$ and $2ZnCO_3 \cdot 3ZnO \cdot 4H_2O$ as flame retardants and smoke suppressants for flexible poly (vinyl chloride)(PVC)." e-Polymers 11.1 (2011). 9 pages.

Specification for Long Term Retardant, Wildland Fire, Aircraft or Ground Application. US Department of Agriculture Forest Service Specification 5100-304b. Jan. 2000. Accessed at https://www.fs.fed.us/rm/fire/documents/304_b.pdf. 24 pages.

Specification for Long Term Retardant, Wildland Firefighting. US Department of Agriculture Forest Service Specification 5100-304d. Jan. 7, 2020. Accessed at https://www.fs.fed.us/rm/fire/wfcs/documents/5100-304d_LTR_Final%20Draft_010720.pdf. 32 pages.

Specification for Long Term Retardant, Wildland Firefighting. US Department of Agriculture Forest Service Specification 5100-304c. Jun. 1, 2007. https://www.fs.fed.us/rm/fire/wfcs/documents/304c.pdf. 30 pages.

Walter et al., "Overview of flame retardants including magnesium hydroxide." Martin Marietta Magnesia Specialties (2015). 9 pages.

Wu et al., "Comparative performance of three magnesium compounds on thermal degradation behavior of red gum wood." Materials 7.2 (2014): 637-652.

Wu et al., "Flame retardancy and thermal degradation behavior of red gum wood treated with hydrate magnesium chloride." Journal of Industrial and Engineering Chemistry 20.5 (2014): 3536-3542.

Zhang et al., "Flame Retardancy of High-Density Polyethylene Composites with P, N-Doped Cellulose Fibrils." Polymers 12.2 (Feb. 5, 2020): 336. 15 pages.

Invitation to Pay Additional Fees, and where Applicable, Protest Fee in International Patent Application No. PCT/US2020/036360 dated Aug. 24, 2020, 6 pages.

Fischel, "Evaluation of selected deicers based on a review of the literature." The SeaCrest Group, Report No. CDOT-DTD-R-2001-15 (Oct. 2001). 170 pages.

International Search Report and Written Opinion in International Patent Application No. PCT/US2020/036360 dated Nov. 30, 2020, 43 pages.

Mostashari et al., "XRD characterization of the ashes from a burned cellulosic fabric impregnated with magnesium bromide hexahydrate as flame-retardant." Journal of thermal analysis and calorimetry 92.3 (2008): 845-849.

Non-Final Office Action in U.S. Appl. No. 16/894,231 dated Dec. 10, 2020, 10 pages.

Águeda Costafreda, Effects of long-term forest fire retardants on fire intensity, heat of combustion of the fuel and flame emissivity. Universitat Politècnica de Catalunya, 2009. 239 pages.

Blakely, "Laboratory method for evaluating forest fire retardant chemicals." (1970). 150 pages.

Huang et al., "Study on EPS thermal insulation mortar prepared by magnesium oxychloride cement." E3S Web of Conferences. vol. 198. EDP Sciences, 2020. 4 pages.

Mostashari et al., "Thermal decomposition pathway of a cellulosic fabric impregnated by magnesium chloride hexahydrate as a flame-retardant." Journal of thermal analysis and calorimetry 93.2 (2008): 589-594.

\* cited by examiner

LONG-TERM FIRE RETARDANT WITH AN ORGANOPHOSPHATE AND METHODS FOR MAKING AND USING SAME

CROSS-REFERENCE TO RELATED APPLICATIONS

This application is a bypass continuation of PCT Application No. PCT/US2020/036367 filed Jun. 5, 2020, which is hereby incorporated herein by reference in its entirety. PCT Application No. PCT/US2020/036367 claims a priority benefit to U.S. provisional application Ser. Nos. 62/858,640, filed on Jun. 7, 2019, 62/989,350 filed on Mar. 13, 2020, 63/024,040 filed on May 13, 2020, and 63/028,765 filed May 22, 2020, which are incorporated herein by reference in their entirety.

BACKGROUND

Long-term retardants contain retardant salts that alter the way a forest fire burns, decrease the fire intensity, and slow the advance of the forest fire. Long-term retardants may be available as wet or dry concentrates that are mixed with water thereby improving water's effectiveness and ability to cling to fuels, over a long period of time. Long-term retardants may be colored with iron oxide, fugitive pigments, or remain uncolored.

In the "Ecological Risk Assessment of Wildland Fire-Fighting Chemicals: Long-Term Fire Retardants" (September 2017), hereby incorporated by reference in its entirety, the United States Forest Service ("USFS") has established a chemical toxicity risk assessment for fire-fighting chemicals currently approved for use by the USFS. The USFS uses a variety of fire-fighting chemicals to aid in the suppression of fire in wildlands. These products can be categorized as long-term retardants, foams, and water enhancers. This chemical toxicity risk assessment of the long-term retardants examines their potential impacts on terrestrial wildlife, plant, and aquatic species.

Further, in Specification 5100-304d (Jan. 7, 2020), Superseding Specification 5100-304b (July 1999), Superseding Specification 5100-00304a (February 1986), entitled "Specification for Long Term Retardant, Wildland Fire, Aircraft or Ground Application," hereby incorporated by reference in its entirety, the United States Department of Agriculture ("USDA") Forest Service has established the maximum allowable corrosion rates for 2024T3 aluminum, 4130 steel, yellow brass and Az-31-B magnesium. The corrosivity of forest fire retardants, in concentrate, to aluminum, steel, yellow brass and magnesium must not exceed 5.0 milli-inches ("mils") per year as determined by the "Uniform Corrosion" test set forth in Section 4.3.5.1 of the USDA Forest Service Specifications. The Forest Service Specifications identify the maximum amount of corrosion acceptable when both the retardant concentrate and its diluted solutions are exposed to each metal indicated above at temperatures of 70° Fahrenheit ("F") and 120° F. in both totally and partially immersed configurations. The maximum allowable corrosivity of aerially applied fire-retardant diluted solutions to aluminum is 2.0 mils per year ("mpy") and the maximum corrosivity to brass and steel is 2.0 mpy when partially immersed and 5.0 when tested in the partially immersed condition. In the partially immersed configurations, one-half of the coupon is within the solution and one-half is exposed to the vapors in the air space over the solution.

SUMMARY

The invention relates generally to fire retardant compositions and more particularly to long-term fire retardants suitable for use in direct or indirect attack of forest fires.

Embodiments of the present technology include a forest fire retardant composition. The forest fire retardant composition is substantially free of ammonium. The forest fire retardant composition includes an organophosphate and a corrosion inhibitor. The organophosphate is derived from a phosphorylation agent and an organic molecule comprising at least two hydroxyl groups. The organic molecule may comprise a polymer. The organic molecule may comprise at least one of an alkylene glycol derivative, a glycerol derivative, or a saccharide derivative. The alkylene glycol derivative may comprise at least one of ethylene glycol, polyethylene glycol, propylene glycol, or polypropylene glycol. The glycerol derivative may comprise at least one of glycerol, diglycerol, or triglycerol. the saccharide derivative may comprise at least one of glucose, sucrose, fructose, xanthan, cellulose, methylcellulose, ethylcellulose, or alginate. The phosphorylation agent may comprise phosphoric acid or phosphoryl chloride.

At least 50% of the functional groups of the organophosphate may comprise a phosphate ester group. Alternatively, at least 75% of the functional groups of the organophosphate may comprise a phosphate ester group. Alternatively, at least 90% of the functional groups of the organophosphate may comprise a phosphate ester group.

In another embodiment, the forest fire retardant composition that is substantially free of ammonium and includes an organophosphate comprising at least one phosphate ester bonded to an organic molecule, and a corrosion inhibitor. The organic molecule in this forest fire retardant composition comprises at least one monomer unit of about 2 to 40 carbon atoms. The organic molecule may comprise at least one of glucose, fructose, glycerol, diglycerol or triglycerol.

The organophosphate may comprise a phosphorylated polymer containing less than 12,000 monomer units. The ratio of phosphate esters to monomer units (phosphate esters:monomer units) in the organophosphate may be about 0.1:1 to about 10:1. The monomer unit may comprise a linear chain of atoms. The monomer unit may comprise at least one six-membered cyclic ring. The monomer units may be bonded together through ether linkages. The monomer unit may comprise at least one of a saccharide, a glycerol, an ethylene glycol or a propylene glycol. The organophosphate may be present in the forest fire retardant composition from about 5% to about 80% by weight.

The forest fire retardant composition may further comprise a salt comprising at least one of magnesium salt, calcium salt, magnesium calcium salt, or a combination thereof. The anion in the salt may comprise at least one of hydroxide, carbonate, or phosphate. The salt may comprise magnesium salt, which may be anhydrous magnesium salt or magnesium salt hydrate. The magnesium salt may comprise at least one of $MgCO_3$, $Mg_3(PO_4)_2$, $Mg_5(CO_3)_4(OH)_2(H_2O)_4$, or $Mg_3(PO_4)_2(H_2O)_8$. As an alternative to using a magnesium salt, or in addition to using a magnesium salt, the salt may further comprise calcium salt, which may be anhydrous calcium salt or calcium salt hydrate. The calcium salt may comprise at least one of $CaCO_3$, $Ca_3(PO_4)_2$, $Mg_3Ca(CO_3)_4$, or $Ca_3(PO_4)_2(H_2O)_2$. The magnesium salt and calcium salt may be present in the composition in a weight ratio (magnesium:calcium) from about 5%:95% to about 95%:5%. The salt may be present in the composition in a weight percent of about 20% to about 70% relative to the amount of organophosphate in the composition.

The corrosion inhibitor in the forest fire retardant composition may be present in a weight percent of 0.5% to 4.0% relative to the amount of organophosphate in the forest fire retardant composition.

The forest fire retardant composition may further comprise a pigment present in a weight percent of about 0.25% to about 6.0% relative to the amount of organophosphate in the forest fire retardant composition. The forest fire retardant composition may further comprise a dye present in a weight percent of about 0.02% to about 3.0% relative to the amount of organophosphate in the forest fire retardant composition. The forest fire retardant composition may further comprise a viscosity modifier present in the forest fire retardant composition in a weight percent of about 0.25% to about 6.0% relative to the amount of organophosphate in the forest fire retardant composition. The forest fire retardant composition may further comprise a surfactant present in a weight percent of about 0.02% to about 5% relative to the amount of organophosphate in the forest fire retardant composition. The forest fire retardant composition may further comprise a glow-in-the-dark additive. The forest fire retardant composition may further comprise a biocide.

The forest fire retardant composition may constitute a liquid concentrate having an organophosphate concentration of about 15% to 99% by weight. For example, the liquid concentrate may have an organophosphate concentration of about 20% to about 70% by weight.

The forest fire retardant composition may further comprise water, in which case the forest fire retardant composition may constitute a final diluted product suitable for use in combating forest fires. The final diluted product may have a weight percent of organophosphate of about 5% to 35%. The final diluted product may have a viscosity of about 100 to about 2,500 centipoise.

In another embodiment, a method of manufacture includes combining, via batch mixing or continuously mixing, (i) an organophosphate, (ii) a corrosion inhibitor, and (iv) a colorant. The components may further comprise a salt comprising at least one of calcium salt, magnesium salt, magnesium calcium salt, or a combination thereof. The salt may be a liquid salt solution.

In another embodiment, a method of manufacture includes receiving a forest fire retardant composition that includes an organophosphate (including at least one of a phosphorylated small molecule or a phosphorylated polymer) and diluting the composition with water, in one or more diluting steps, to achieve at least one of a liquid concentrate and/or a final diluted product.

In another embodiment, a method of combating a forest fire includes depositing, via aerial or ground-based application, a forest fire retardant composition containing an organophosphate, a corrosion inhibitor, and water. The step of depositing includes at least one of a direct attack on the fire or an indirect attack before the fire. Combatting a forest fire includes at least one of suppressing, retarding, and/or controlling the forest fire. The step of depositing may be performed via aerial application from an airplane or helicopter. Alternatively, the step of depositing may be performed via ground-based equipment. The organophosphate in the forest fire composition deposited may have a concentration of about 5% to about 35% by weight.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

In General

As used herein, a dry concentrate means a concentrate that has the appearance of a dry free-flowing powder, a waxy solid, or a greasy solid. A dry concentrate may include small amounts of liquid components, including liquid organophosphate, water, other solvent(s) or aqueous solutions in concentrations low enough to be substantially adsorbed onto the dry components, thereby having the appearance of a dry free-flowing powder, a waxy solid, or a greasy solid. As used herein, a liquid concentrate means a concentrate that is a liquid. A liquid concentrate may include water, other solvent(s), aqueous solution(s), or any combination thereof.

Figure 1:
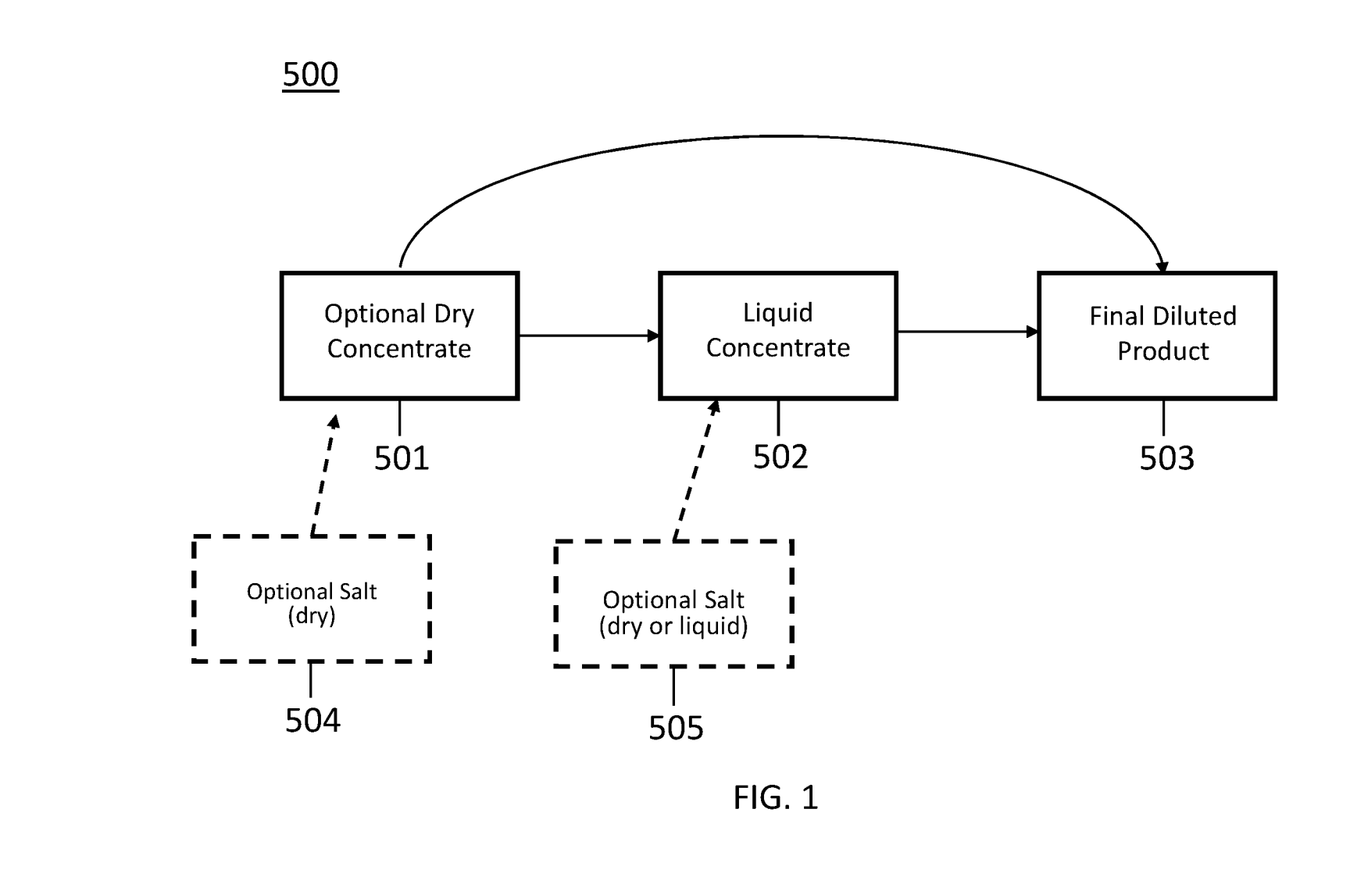
FIG. 1 is a flow chart diagram showing the process of making a forest fire retardant composition.

Referring to FIG. 1, a forest fire retardant composition 500 can be provided in various forms. The composition 500 can be provided as a dry concentrate 501 substantially free of water. Alternatively, the composition 500 can be provided as a liquid concentrate 502. The liquid concentrate 502 may be formed by adding water, other solvent(s) or aqueous solutions to the composition when it is prepared. Alternatively, the liquid concentrate 502 may be formed by adding water, other solvent(s) or aqueous solutions to the dry concentrate 501. Alternatively, liquid concentrate 502 may be formed when the dry concentrate 501 is deliquescent, hygroscopic, and absorbs moisture from the air or other moisture source. Alternatively, the liquid concentrate 502 may include a liquid organophosphate. If the liquid concentrate 502 includes a liquid organophosphate, the liquid concentrate 502 may include water, other solvent(s), aqueous solution(s), or any combination thereof. The composition 500 can also be provided as a final diluted product 503 in a form suitable to fight forest fires via aerial- or ground-based application. The final diluted product 503 is formed either by diluting the dry concentrate 501 with water or by diluting the liquid concentrate 502 with water.

Components of the Forest Fire Retardant

The forest fire retardant composition 500 includes an organophosphate. The organophosphate may include one or more phosphate esters bonded to an organic molecule. The organic molecule includes at least one monomer unit of about 2 to about 40 carbon atoms. The organic molecule can be a small molecule, such as glycerol, diglycerol, triglycerol, glucose or fructose. Alternatively, the organic molecule can be a polymer of repeating monomer units up to 12,000 repeating monomer units. Bridges between repeating monomer units may be ether linkages. The monomer unit can be small and/or linear, such as in polyethylene glycol, or large and/or cyclic, such as in xanthan. The polymer backbone can be polyethylene glycol, polypropylene glycol, and/or another linear or branched chain. Alternatively, the polymer backbone can be xanthan, alginate, cellulose, methylcellulose, ethylcellulose or another polysaccharide. The small organic molecule is preferably triglycerol. The polymer organic molecule is preferably cellulose. The forest fire retardant composition 500 may include one organophosphate or a combination of several organophosphates.

Figure 2:
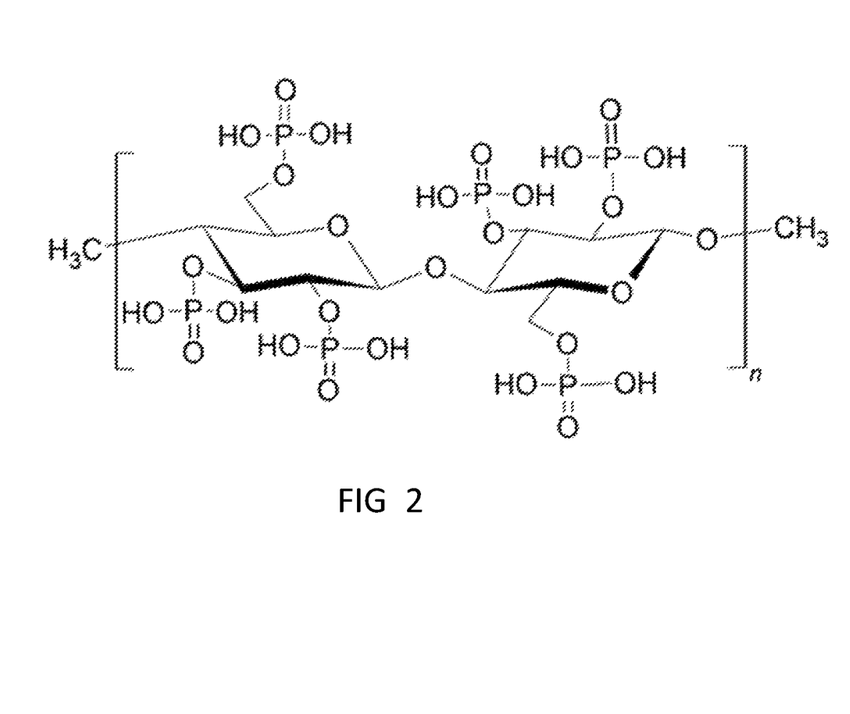
FIG. 2 is a chemical structure of a cellulose monomer with six phosphate ester functional groups.

The number of phosphate ester functional groups on the organic molecule can vary depending on the size of the organic molecule and on the amount of functionalization. Phosphorylated small molecules may be functionalized with about 1 to about 10 phosphate ester groups. Phosphorylated polymers may be functionalized with a larger number of phosphate ester groups. Phosphorylated polymers may be functionalized so that not all monomers have phosphate esters. Alternatively, for example, in instances when the monomer unit is more complex, each monomer unit can be functionalized with up to 10 phosphate ester functional groups. The ratio of phosphate esters to monomers (phosphate ester:monomer) is about 0.1:1 to about 10:1, preferably about 0.5:1 to about 8:1, and particularly about 2:1 to about 6:1. The phosphorylated small molecule is preferably triglycerol with at least two phosphate ester functional groups, and more preferably six phosphate ester functional groups. Alternatively, the phosphorylated small molecule may be functionalized with one phosphate ester per monomer unit, as in glycerol phosphate or poly(glycerol phosphate)$_n$, where n is about 2 to about 5, and more preferably where n is about 3. The phosphorylated polymer is preferably cellulose with 95% of the monomers functionalized with at least one phosphate ester functional group and with each cellulose monomer functionalized with about 4 to about 6 phosphate ester functional groups. Referring to FIG. 2, the cellulose monomer can have up to 6 phosphate ester functional groups.

The organophosphate may be derived from an organic molecule with two or more hydroxyl groups that has undergone a reaction with a phosphorylation agent. The organic molecule may be at least one of a small molecule or a polymer, such as a polyol. In a reaction between a hydroxylated organic molecule and a phosphorylation agent, one or more hydroxyl functional groups on the organic molecule may be replaced by phosphate ester groups to produce the organophosphate. The organic molecule may be an alkylene glycol derivative, such as ethylene glycol, propylene glycol, or polymers of these compounds. Alternatively, the organic molecule may be a glycerol derivative, such as diglycerol or triglycerol. Alternatively, the organic molecule may be a saccharide, such as glucose, xanthan, alginate, cellulose, methylcellulose or ethyl cellulose. The phosphorylation agent may be phosphoric acid or phosphoryl chloride. The organophosphate may be functionalized so that the number of functional groups that are phosphate esters is about 10% to about 99%, preferably about 50% to about 95%, and particularly about 85% to about 95%.

Referring to FIG. 1, the composition 500 may begin as a dry concentrate 501 substantially free of water. As used herein, "substantially free of water," when referring to the dry concentrate 501, does not refer to water, solvents or other liquids absorbed or adsorbed into the dry concentrate 501. The dry concentrate 501 may be in the form of a hard solid, a waxy solid, or a greasy solid. The dry concentrate 501 may have no more than about 3% by weight of water relative to the total weight of the concentrate. The dry concentrate 501 may have an organophosphate concentration of about 60% to about 99% by weight relative to the total weight of the concentrate.

The liquid concentrate 502 may be formed by adding water, other solvent(s) or aqueous solutions to the composition when it is prepared. Alternatively, the composition 500 may be a liquid concentrate 502 formed by the addition of water or other solvent to the dry concentrate 501. The water may be tap water or water from other convenient water sources. Alternatively, the liquid concentrate 502 may include a liquid organophosphate. If the liquid concentrate 502 includes a liquid organophosphate, the liquid concentrate 502 may include water, other solvent(s), aqueous solution(s), or any combination thereof. In the liquid concentrate 502, the weight percent of organophosphate is about 15% to about 99%, preferably about 15% to about 90%, more preferably 20% to 70%, and particularly about 30% to about 60%. For example, the weight percent of organophosphate in the liquid concentrate 502 is about 35% to about 55%. In the liquid concentrate 502, water may be present in a concentration of about 5% to about 70% by weight relative to the total weight of the concentrate.

The forest fire retardant composition 500 is substantially free of ammonia. Preferably, the organophosphate does not contain any ammonium functionalized compounds. Ammonium-functionalized compounds may cause long-term adverse effects in the aquatic environment. Additionally, ammonium-functionalized compounds may release ammonia gas upon combustion. Ammonia gas is acutely toxic and may cause burns to the skin and eyes. Additionally, ammonia is toxic to aquatic organisms. The forest fire retardant composition 500 is less toxic than those forest fire retardants that contain ammonia or ammonium-functionalized compounds.

The forest fire retardant composition 500 may further include a corrosion inhibitor. The corrosion inhibitor includes an inhibitor for brass, iron, aluminum, steel, copper, or magnesium. The corrosion inhibitor for magnesium may include COBRATEC 928, Denatonium benzoate, benzoic acid, Diammonium phosphate, monoammonium phosphate, Wintrol SB 25Na, or a combination of the above. The corrosion inhibitor may include one or more azoles. The corrosion inhibitor may be a Wintrol® Super Azole Mix (Wintrol® SAM-H90 from Wincom, Inc). The Wintrol® SAM-H90 is designed for aqueous application. Wintrol® SAM-H90 provides corrosion resistance in highly corrosive environments caused by halogens, such as chloride. Optionally, Wintrol® SAM-H38Na may be used as the corrosion inhibitor, alone or in combination with Wintrol® SAM-H90. The corrosion inhibitor may be, including but not limited to, sodium selenite, sodium silicate, sodium stearate, sodium benzoate, sodium fluoride, sodium phosphate, magnesium phosphate, magnesium diphosphate, benzotriazole-5-carboxylic acid, benzotriazole, 1,8-napthalaldehydic acid, octadecylphosphonic acid, sodium dodecyl sulfonate (SDBS), Wintrol® BBT-25Na, Wintrol® BBT, Wintrol® THT-T, Wintrol® THT-35PG, Wintrol® THT-50K, Wintrol® SAM-H90, Wintrol SB 25Na, Wintrol® SAM-H38Na, Wintrol® SAM-H40(OS), Wintrol® SAM-B90, berberine, pyrrolidine riccione, catechin, lysergic acid, carmine, fast green, aniline, triethanolamine, p-chloroaniline, p-nitroaniline, p-methoxyaniline, p-methylaniline, or a combination of the above.

The weight percent of the corrosion inhibitor, relative to the amount of organophosphate in the composition 500 is about 0.25% to about 5.0%, preferably about 0.5% to about 4.5%, more preferably about 0.75% to about 4.0%, and specifically about 1.0% to about 3.5%. For example, the weight percent of the corrosion inhibitor, relative to the amount of organophosphate in the composition 500 is about 1.0% to about 3.0%.

The forest fire retardant composition 500 may include a salt 504, including any salt disclosed in U.S. Patent Application Nos. 62/858,640, 62/989,350, or 63/024,040 which are hereby incorporated by reference in their entirety. The salt 504 may include magnesium salt. The anion in the magnesium salt may be at least one of hydroxide, carbonate, or phosphate. The magnesium salt may have the formula $MgCO_3$, $Mg_3(PO_4)_2$, $Mg(OH)_2$, or $Mg_5(CO_3)_4(OH)_2$. The salt 504 may include a mixture of more than one magnesium salt. The magnesium salt can be anhydrous, substantially free of any hydrate. Alternatively, the magnesium salt can be a hydrate, substantially free of any anhydrous. Alternatively, the magnesium salt can be a combination of anhydrous and hydrate. The hydrate may have the formula $MgA_x(H_2O)_y$, where A is an anion, x is equal to the number of anions in the ionic compound and y is equal to the number of hydrates. The magnesium salt hydrate is preferably $Mg_5(CO_3)_4(OH)_2(H_2O)_4$, $Mg_3(PO_4)_2(H_2O)_8$, or another magnesium salt hydrate.

Instead of (or in addition to) magnesium salt, the salt 504 may be calcium salt and/or the salt 504 may be magnesium calcium salt that includes both magnesium and calcium cations. The anion in the calcium salt and/or magnesium calcium salt may be at least one of hydroxide, carbonate or phosphate. The calcium salt may have the formula $CaCO_3$, $Ca_3(PO_4)_2$, $Ca(OH)_2$. The salt 504 may include a mixture of more than one calcium salt or magnesium calcium salt. For example, the magnesium calcium salt may have the formula $Mg_3Ca(CO_3)_4$. The calcium salt or magnesium calcium salt can be anhydrous, substantially free of any hydrate. Alternatively, the calcium salt and/or magnesium calcium salt can be a hydrate, substantially free of any anhydrous. Alternatively, the calcium salt and/or calcium magnesium can be a combination of anhydrous and hydrate. The hydrate may have the formula $CaA_x(H_2O)_y$, where A is an anion. The calcium salt hydrate is preferably $Ca_3(PO_4)_2(H_2O)_2$ or another calcium salt hydrate.

In the composition 500, the weight percent of magnesium salt (including both anhydrous and hydrate): calcium salt (including both anhydrous and hydrate) is about 0%:100% to about 100%:0%, preferably about 5%:95% to about 95%:5%, more preferably about 25%:75% to about 75%:25%, and particularly around 45%:55% to about 55%:45%. For example, the weight percent of magnesium: calcium is about 50%:50%. The calcium salt forest fire retardant composition may be used for a liquid concentrate.

The weight percent of the salt 504, relative to the amount of organophosphate in the composition 500 is about 0% to about 80%. For example, the weight percent of the salt 504 relative to the amount of organophosphate in the composition 500 may be about 20% to about 80%.

To control the viscosity of the composition 500, the composition 500 may also include at least one viscosity modifier. The viscosity modifier may be a polyurethane, a polyvinyl alcohol, an acrylic polymer, a gum, a cellulosic, a sulfonate, a polyurethane, a saccharide, a clay, an organo- silicone, or a protein, including but not limited to latex, styrene, butadiene, polyvinyl alcohol, attapulgite, bentonite, montmorillonite, algin, collagen, casein, albumin, castor oil, cornstarch, arrowroot, yuca starch, carrageenan, pullulan, konjac, alginate, gelatin, agar, pectin, carrageenan, chitosan, xanthan gum, guar gum, cellulose gum, acacia guar gum, locust bean gum, acacia gum, gum tragacanth, glucomannan polysaccharide gum, alginic acid, sodium alginate, potassium alginate, ammonium alginate, calcium alginate, polyethylene glycol, carboxymethyl cellulose (CMC), methyl cellulose, hydroxyethyl cellulose (HEC), hydroxymethyl cellulose (HMC), hydroxypropyl methylcellulose (HPMC), ethylhydroxymethyl cellulose, hypromellose (INN), cetyl alcohol, cetearyl alcohol, acrylic microgel, or acrylic amide wax.

In one embodiment, the forest fire retardant composition 500 includes a first viscosity modifier. The first viscosity modifier may be a polysaccharide gum.

In another embodiment, the forest fire retardant composition 500 includes both the first viscosity modifier (discussed above) and a second viscosity modifier. The second viscosity modifier may be a chemically substituted cellulose.

The weight percent of the viscosity modifier, relative to the amount of organophosphate in the composition 500 is about 0% to about 5%, preferably about 0% to about 4%, more preferably about 0% to about 3%, and more specifically about 0% to about 2%. For example, the weight percent of viscosity modifier, relative to the amount of organophosphate in the composition 500, may be about 0.05% to about 5.0%.

The forest fire retardant formulation 500 may further include a strong base, including but not limited to magnesium hydroxide ($Mg(OH)_2$), calcium hydroxide ($Ca(OH)_2$), sodium hydroxide (NaOH), lithium hydroxide (LiOH), barium hydroxide ($Ba(OH)_2$), sodium carbonate ($Na_2CO_3$), or potassium hydroxide (KOH). The strong base may act as a flame retardant in the composition 500. Alternatively (or in addition), the strong base may be used to control the pH of the composition 500. The weight percent of strong base, relative to the amount of organophosphate in the composition 500 is about 0.05% to about 60%. For example, the weight percent of strong base, relative to the amount of organophosphate in the composition 500 may be about 0.05% to about 3%. In an alternative example, the weight percent of strong base, relative to the amount of organophosphate may be about 20% to about 60%.

To control the pH of the composition 500, the composition 500 may also include buffering agents such as organic amines including but not limited to triethanolamine ($C_6H_{15}NO_3$), diethanolamine, monoethanolamine, or monoethylene glycol. The weight percent of the organic amine, relative to the amount of organophosphate in the composition 500, is about 0.25% to about 5.0%, preferably about 0.5% to about 4.5%, more preferably about 0.75% to about 4.0%, and specifically about 1.0% to about 3.5%. For example, the weight percent of the organic amine, relative to the amount of organophosphate in the composition 500, is about 1.0% to about 3.0%.

The composition 500 may also include surfactant components such as sodium dodecyl sulfate (SDS), sodium lauryl sulfate (SLS), sodium 4-dodecylbenzenesulfonate (SDBS), 4-dodecylbenzenesulfonic acid, sodium octyl sulfate, butylnapthalenesulfonic acid sodium salt, potassium oleate, or a combination of more than one surfactant, to reduce surface tension and increase the spreading and wetting properties of the forest fire retardant composition 500. The weight percent of surfactant, relative to the amount of organophosphate in the composition 500, is about 0.005% to about 5.0%, preferably about 0.01% to about 4%, more preferably about 0.02% to about 3%, and more specifically about 0.05% to about 2.5%. For example, the weight percent of surfactant, relative to the amount of organophosphate in the composition 500, is about 0.06% to about 2.4%, and specifically about 0.08% to about 2.32%.

The composition 500 may also include adjuvants including but not limited to triethanolamine, propylene glycol, propylene carbonate, RJ-7033, RJ-7077, Silwet HS-312, Silwet HS-604, Silwet 625, Silwet 641, Silwet PD, polyethylene glycol, or polypropylene glycol, or a combination of the above.

The composition 500 may also include a pigment such as titanium dioxide. The titanium dioxide may act as a pigment, for example, to provide a white pigment. The titanium dioxide may also act as a photo-responsive material to create opacity by scattering light or by protecting the components of the forest fire retardant composition 500 from UV degradation.

The composition 500 may also include a pigment that is a colorant. The colorant may be a fugitive colorant, a non-fugitive colorant, or a combination of the two. The composition 500 has a first hue which is a color, i.e., either colorless or a color which blends with the normal vegetation and/or ground in the drop zone. This first hue may be grey or white or a combination of the two. The colorant initially colors the composition 500 to a second hue which contrasts with the hue of the ground vegetation. The colorant may be a fugitive component such as a dye or a dye which is dispersed in a matrix (i.e., a pigment), which fades over time and under ambient field conditions to a colorless or less highly colored hue. Preferably the colorant is one that is compatible with magnesium salt or calcium salt such as colorants that have been used in de-icing, dust control, or fertilizers. The fugitive colorant may fade over time with exposure to sunlight.

Several fugitive component dyes and pigments can be used as a colorant. For example, many water-soluble dyes fade rapidly and there are so-called fluorescent pigments (fluorescent dyes encapsulated in a resin integument) which are suspended in forest fire retardant compositions and which also fade rapidly to provide a fugitive effect. Examples of fugitive dyes and pigments include, but are not limited to, C.I. Basic Red I dye, 6BL dye, Basic Violet II dye, Basic Yellow 40, acid fuchsin, basic fuchsin, new fuchsin, acid red 1, acid red 4, acid red 8, acid red 18, acid red 27, acid red 37, acid red 88, acid red 97, acid red 114, acid red 151, acid red 183, acid red 183, fast red violet 1B base, solvent red, Rhodamine B, Rhodamine 6G, Rhodamine 123, erythrosine B, Basacryl red, Phloxine B, rose Bengal, direct red 80, direct red 80, Sudan red 7B, Congo red, neutral red, Fluorescent Red Mega 480, Fluorescent red 610, Fluorescent red 630, Fluorescent Red Mega 520, Pylaklor Red S-361, Pylaklor Scarlet LX-6364A Pylam Bright Red LX-1895 Pylam Coral LX-1801, FD&C Red #3, FD&C Red #4, FD&C Red #40, FD&C Red #4 Lake, D&C Red #33, D&C Red #33 Lake, and encapsulated-dye pigments which are available commercially, e.g., the "AX" series pigments, supplied by Day-Glo Color Corp., Cleveland, Ohio. The dye may be Liquitint 564 ($\lambda$=564 nm) or Liquitint Agro Pink 564 ($\lambda$=564 nm) from Milliken & Company (Spartanburg, S.C.).

The colorant may be a colorant from Greenville Colorants (New Brunswick, N.J.) or Milliken & Company (Spartanburg, S.C.). For example, the colorant is a colorant that is compatible for use with magnesium salt, such as colorants used in magnesium salt dust-control and road-stabilization formulations, or in magnesium salt de-icing formulations. The colorant may be Elcomine Scarlet NAS, Elcomine Scarlaet NAS EX, or Iron Oxide GC-110P from Greenville Colorants. The colorant may be a combination of Liquitint 564 and Iron Oxide GC-110P.

The colorant of the composition 500 may be a dye or include encapsulated-dye fugitive pigments without ultraviolet absorbers. Compared to water soluble dyes, encapsulated-dye pigments are less likely to permanently stain the normal vegetation and/or ground in the drop zone. The fugitive component is present in an amount which provides a color (second hues) to the forest fire retardant composition 500 which is contrasts with the color of the vegetation and/or ground in the drop zone (normally green, blue-green and/or brown). Advantageously, the second hue is red, orange or pink. The color of the dye may be red, orange, purple, pink or any combination of the four. Preferably, the dye is one that is compatible with organophosphate and magnesium salt.

The colorant may also include a non-fugitive component, i.e., a component which is insoluble in the carrier liquid and which, if colored, does not necessarily fade after aerial application of the forest fire retardant composition 500. The non-fugitive component of the colorant is present in an amount sufficient to improve the aerial visibility of the composition when it is first applied to the vegetation. However, the non-fugitive component is present in less than an amount which prevents the composition from thereafter fading a neutral color. The colorant may be a combination of the fugitive and non-fugitive components. The non-fugitive component in the forest fire retardant composition 500 may be iron oxide ($Fe_2O_3$ and/or $Fe_3O_4$). The iron oxide may be present in combination with the fugitive colorant described above and titanium dioxide or it may be present alone.

The weight percent of pigment, such as titanium dioxide, colorant, or Iron Oxide or Iron Oxide Black, relative to the amount of organophosphate in the composition 500, is about 0.25% to about 20%, preferably about 0.5% to about 18%, more preferably about 0.75% to about 16%, and more specifically about 1.0% to about 14%. For example, the weight percent of pigment, relative to the amount of organophosphate in the composition 500, is about 1.2% to about 12%.

The weight percent of dye, relative to the amount of organophosphate in the composition 500, is about 0.02% to about 3.0%, preferably about 0.025% to about 2.0%, more preferably about 0.05% to about 1.5%, and more specifically about 0.075% to about 1.2%. For example, the weight percent of dye, relative to the amount of organophosphate in the composition 500, is about 0.3% to about 1.1%.

The composition 500 may also include a glow-in-the-dark additive. The glow-in-the-dark additive improves the visibility of the fire-retardant composition during periods of darkness. Nighttime visibility of the composition is improved, for example, to the naked human eye and/or using imaging equipment such as goggles. The glow-in-the-dark additive can include one or more phosphorescent additives that imparts photoluminescence properties to the forest fire retardant composition 500. The phosphorescent additive may exhibit fluorescence and/or phosphorescence. The phosphorescent additive may be charged with sunlight or artificial lighting, such as UV radiation or Fluorescent lighting. The phosphorescent additive may emit light in the visible light region or in the ultraviolet region. Alternatively, the phosphorescent additive may emit light in the near infrared region and be visualized using infrared goggles.

Examples of the phosphorescent additive include Lumi-Nova, LumiNova Green (G), LumiNova G PS-2, LumiNova Blue Green (BG), a zinc sulfide pigment, or mixtures thereof. The amount of the glow-in-the-dark additive, relative to the amount of composition 500 is about 100 g/1000 L to about 1000 g/1000 L, preferably about 200 g/1000 L to about 800 g/1000 L, and more preferably about 300 g/1000 L to about 700 g/1000 L. For example, the amount of the glow-in-the-dark additive, relative to the amount of composition 500 is about 350 g/1000 L to about 550 g/1000 L.

The glow-in the-dark additive may also include one or more fluorophores. The fluorophore(s) may exhibit fluorescence and/or phosphorescence. The fluorophore(s) may be visible in the near infrared region (i.e., 700 nm-1700 nm wavelength of light). Visualization can be achieved using near infrared goggles. Examples of fluorophores include CH1055 (4.8-Bis(2-(4-(bis(4-(2-carboxyethyl)phenyl)amino)phenyl)-5H-[1,2,5]thiadiazolo[3,4-f]benzo[c][1,2,5]thiadiazole), as well as Cy7 or Cy7.5, or mixtures thereof.

The composition 500 may also include mineral oil. The mineral oil may help reduce dusting during handling of the dry concentrate 501.

The composition 500 may optionally include other ingredients, such as spoilage inhibitors, flow conditioners, anti-foaming agents, foaming agents, stability additives, biocide, thickening agents, surfactants, adjuvants, corrosion inhibitors other than those of the corrosion inhibiting system, opacifying pigments, additional coloring agents, liquid carrier, and water.

Forming the Dry and Liquid Concentrates

The dry components of the forest fire retardant composition 500 are batch mixed in a tumbler to form a dry concentrate 501. Alternatively, the dry concentrate 501 may be mixed using continuous mixing equipment. The mixing should be controlled to ensure that all of the dry components are adequately dispersed. First, any dry ingredients (solid organophosphate, salt, viscosity modifier, titanium dioxide, surfactant, colorant, and dye) are mixed together. Then, any remaining ingredients (liquid organophosphate, triethanolamine, and Wintrol® SAM-H90) are slowly added to the mixture while mixing. The dry concentrate 501 is then stored, substantially in the absence of air and/or external moisture, in a sealed bag having a plastic liner. For example, each sealed bag can contain about 2,000 pounds of the dry concentrate 501 during storage and shipment to the point of use (e.g., airfield). Alternatively, the dry concentrate 501 may be stored in lined one-ton tote sacks or super sacks. Air-sealed bags with a plastic liner supplied by Semi-Bulk Systems Inc. (St. Louis, Mo.) can be used. Alternatively, an air-permeable moisture barrier can be used, such as a barrier made of a silicone material. The dry concentrate 501 is substantially free of water. The dry composition 501 is chemically stable under normal temperatures and pressures. The dry concentrate 501 should be protected from exposure to humidity and moisture on moisture-proof air pallets or under a water-resistant tarp during storage.

The liquid concentrate 502 can be formed by adding water, other solvent(s) or aqueous solutions to the composition when it is prepared. Alternatively, the liquid concentrate 502 may be formed by the addition of water or other solvent to the dry concentrate 501. The water may be tap water or water from other convenient water sources. Alternatively, the liquid concentrate 502 may be formed upon absorption of moisture by the dry concentrate 501 if the dry concentrate 501 is deliquescent. Alternatively, the liquid concentrate 502 may be formed by mixing a liquid organophosphate with dry components. Alternatively, if a dry salt 504 is not present in the dry concentrate 501, then a salt 505 may be added during the process of converting the dry concentrate 501 to the liquid concentrate 502. Alternatively, in the absence of dry concentrate 501, a salt 505 may be added to the liquid concentrate 502 in the process of its preparation. The salt 505 may be a dry salt or a liquid salt. For example, to produce the liquid concentrate 502, a liquid salt 505 is added to the dry concentrate 501 (with or without the addition of more water or solvent beyond that contained in the liquid salt). The liquid salt may be a concentrated solution of magnesium salt, calcium salt and/or magnesium calcium salt, including any liquid solutions made using the dry salt 504. The weight percent of the salt 505 in the liquid salt solution is about 10% to 60%, preferably about 15% to 55%, more preferably about 20% to about 50%, and particularly about 22% to about 45%, or about 25% to about 40%, or about 26% to about 33%. For example, the amount of magnesium salt, calcium salt and/or magnesium calcium salt in the liquid salt solution is at or near the maximum soluble limit of magnesium salt, calcium salt or magnesium calcium salt, respectively.

Any dry components and/or the dry concentrate 501 are first mixed to disperse the components in the dry blend before any liquid additions. The dry components and/or the dry concentrate 501 is agitated to prevent clumping of the dry components when batch mixed with water or other solvent to form the liquid concentrate 502. Alternatively, any dry components and/or the dry concentrate 501 may be mixed with water or other solvent to form the liquid concentrate 502 using continuous mixing equipment. The mixing should be controlled to ensure that all of the dry components are adequately dispersed and hydrated to ensure that the formulation is maintained. Alternatively, the water, liquid organophosphate, liquid salt solution 505, or solvent may be added by spraying onto a ribbon of well-mixed dry ingredients. For example, the water, liquid organophosphate, liquid salt solution 505, or other solvent could be sprayed onto the dry components while traveling across a conveyor belt. Once mixed, the liquid concentrate 502 is then stored, substantially in the absence of air and/or external moisture, in a sealed container. For example, the sealed container for storage and shipment to the point of use (e.g., airfield) may be a 1,000 L tote, a 5-gallon pail or a 55-gallon drum. Air-sealed bags with a plastic liner supplied by Semi-Bulk Systems Inc. (St. Louis, Mo.) can be used. Alternatively, an air-permeable moisture barrier can be used, such as a barrier made of a silicone material. The liquid concentrate 502 is chemically stable under normal temperatures and pressures.

The dry concentrate 501 and/or the liquid concentrate 502 may be supplied as part of a kit that includes a sealed container for storage and shipment, substantially in the absence of air and/or external moisture (e.g., 1,000 L tote, a 5-gallon pail or a 55-gallon drum, lined one-ton tote sacks or super sacks, including a plastic liner) and instructions for using the dry concentrate 501 or the liquid concentrate 502 to form the final diluted product 503 (described below). In the case where the final diluted product 503 is to be applied on a localized scale by homeowners or local officials, for example, the kit may contain a tank for mixing and applying the final diluted product 503 (e.g., a 1-2 gallon hand-held or 4 gallon backpack or 5 gallon cart-style container with an applicator wand and/or hose, or a 15-25 gallon tank capable of being mounted on or pulled behind an all-terrain vehicle or truck), and instructions for using the dry concentrate 501 and/or the liquid concentrate 502 to form and apply the final diluted product 503.

Forming the Final Diluted Product

The final diluted product 503 is formed either directly from the dry concentrate 501 by mixing the dry concentrate 501 with water or by mixing the liquid concentrate 502 with water. The dry concentrate 501 or the liquid concentrate 502 is shipped to the point of use (e.g., airfield), where it is diluted with water or other solvent to form the final diluted product 503. The dry concentrate 501 is added slowly into room temperature (or cooler) water with stirring. The liquid concentrate 502 is designed for addition to water in a volume ratio concentrate:water of about 1.00 to 2.50 to about 1.00 to about 6.00. The water may be tap water or water from other convenient water sources. The product is mixed using the current mixing equipment available to the user, including the USFS.

The final diluted product 503 can also be prepared on a commercial batch scale by combining the dry concentrate 501 or the liquid concentrate 502 with a measured amount of water in an appropriate mix vessel such as an agitated mix tank. The rate of addition of solid or liquid concentrate to water should be controlled to assure efficient mixing of the concentrate and the water. Alternately, a continuous process may be conducted by introducing the dry concentrate 501 or liquid concentrate 502 into a water stream via a vacuum eductor system where the ratio of flow through the eductor port to the bypass flow is roughly 1:9. Downstream mixing should be accomplished to avoid product settling in the receiving tank, or the receiving tank itself should be vigorously circulated to facilitate solution and adequate hydration of the dry concentrate 501.

The final diluted composition 503 can also be batch mixed by feeding the dry concentrate 501 or the liquid concentrate 502 into a well-circulated mix-batch tank. Alternatively, the final diluted composition 503 may be mixed using continuous mixing equipment. Mix tank agitation may be provided via an overhead mechanical stirring apparatus or alternatively by a circulation pump sized to provide turbulent mixing. Alternatively, a venturi-type vacuum eductor mixer or an in-line high-shear mixer can be used. For batch mixing, the mix water is agitated or circulated to provide efficient mixing, then a one-ton sack of dry concentrate 501 is added slowly, typically by suspending the sack over the mix tank (via a fork lift or by other manner), and opening the discharge spout on the sack to allow product to flow out of the sack into the mix solution. The addition rate should be controlled to avoid settling of the solid concentrate in the mix tank. The final diluted product 503 is in a form suitable to fight forest fires via aerial- or ground-based application.

The dry concentrate 501 or the liquid concentrate 502 is diluted with water so that the final diluted product 503 has an organophosphate concentration of about 1% to about 50%, preferably about 3% to about 45%, more preferably about 5% to about 35%, and more specifically about 7% to about 32%. For example, the weight percent of the organophosphate in the final diluted product 503 is about 8% to about 30%.

The liquid concentrate 502, may be diluted at about a 1.00:2.50, 1.00:4.00, 1.00:5.00, or 1.00:6.00 (liquid concentrate:water) to form the final diluted product 503. The liquid concentrate 502 is diluted with water so that the final diluted product 503 has an organophosphate concentration of about 1% to about 5%, preferably about 3% to about 45%, more preferably about 5% to about 40%, and more specifically about 7% to about 35%. For example, the weight percent of the organophosphate in the final diluted product 503 is about 8% to about 30%.

The viscosity of the liquid concentrate 502 should have a viscosity that permits it to be pumped through a hose. The viscosity of the liquid concentrate 502 at 70° F. may be in the range of about 100 cP to about 10,000 cP, preferably about 500 cP to about 7,000 cP, more preferably about 750 cP to about 5,000 cP, and more specifically about 1,000 cP to about 3,000 cP. For example, the viscosity of the liquid concentrate 502 at 70° F. may be about 2,000 cP.

The final diluted product 503 should have a viscosity that permits it to be pumped through a hose and applied to a forest fire. The viscosity of the final diluted product 503 at 70° F. may be in the range of about 1 to about 1,000 cP, preferably about 100 to about 700 cP, more preferably about 120 to about 500 cP, and more specifically about 150 cP to about 400 cP.

EXAMPLES

Example 1

Example 1 includes an organophosphate and does not include a salt. In Example 1 below, a liquid concentrate 502 is prepared containing the amounts of ingredients listed in Table 1 below. The values in Table 1 can be varied by ~0.1%, ~0.5%, or ~1.0%, or ~1.5%, or ~2%, or ~2.5%, or ~3.0%, or ~3.5%, or ~4.0%, or ~4.5%, or ~5.0%.

TABLE 1

Liquid Concentrate according to Example 1

| Ingredient | Weight Percent of Each Ingredient in Wet Concentrate |
| --- | --- |
| Salt | 0.00% |
| Organophosphate | 50.00% |
| Pigments | 1.00% |
| Magnesium Hydroxide | 0.32% |
| Triethanolamine ($C_6H_{15}NO_3$) | 0.58% |
| Corrosion Inhibitor | 0.58% |
| Dye | 0.21% |
| Surfactant | 0.04% |
| Viscosity modifier | 0.00% |
| Water | 47.27% |

An Example 1 final diluted product 503 is prepared by mixing the liquid concentrate 502 of Example 1 with water in a volume ratio concentrate:water of 1.00 to 1.50. According to Example 1 approximately 1 pound of the liquid concentrate 502 is mixed with 1.50 pounds of water to prepare the final diluted product 503. The final diluted product 503 of Example 1 may be prepared by mixing the liquid concentrate 502 of Example 1 with water in a volume ratio concentrate:water of about 1.0 to about 1.1 to about 1.0 to about 3.0.

The weight percent of the salt 504, relative to the amount of organophosphate in the composition 500 of Example 1 is about 0%.

The weight percent of strong base, relative to the amount of organophosphate in the composition 500 of Example 1 is about 0.05% to about 10%, preferably about 0.1% to about 8%, more preferably about 0.15% to about 6%, and more specifically about 0.2% to about 5%. For example, the weight percent of strong base, relative to the amount of organophosphate in the composition 500, is about 0.25% to about 4.0%, and specifically about 0.32%.

The amounts of the ingredients in the Example 1 final diluted product 503 are listed in Table 2 below. The values in Table 2 can be varied by ~0.1%, ~0.5%, or ~1.0%, or ~1.5%, or ~2%, or ~2.5%, or ~3.0%, or ~3.5%, or ~4.0%, or ~4.5%, or ~5.0%.

TABLE 2

Final Diluted Product according to Example 1

| Ingredient | Weight Percent of Each Ingredient in Wet Concentrate |
|---|---|
| Salt | 0.00% |
| Organophosphate | 19.98% |
| Pigments | 0.40% |
| Magnesium Hydroxide | 0.13% |
| Triethanolamine ($C_6H_{15}NO_3$) | 0.23% |
| Corrosion Inhibitor | 0.23% |
| Dye | 0.08% |
| Surfactant | 0.02% |
| Viscosity modifier | 0.00% |
| Water | 78.93% |

Example 2

Example 2 includes an organophosphate and a salt. In Example 2 below, a liquid concentrate 502 is prepared containing the amounts of ingredients listed in Table 3 below. The values in Table 1 can be varied by ~0.1%, ~0.5%, or ~1.0%, or ~1.5%, or ~2%, or ~2.5%, or ~3.0%, or ~3.5%, or ~4.0%, or ~4.5%, or ~5.0%.

TABLE 3

Liquid Concentrate according to Example 2

| Ingredient | Weight Percent of Each Ingredient in Wet Concentrate |
|---|---|
| Salt | 25.00% |
| Organophosphate | 50.00% |
| Pigments | 2.00% |
| Magnesium Hydroxide | 0.64% |
| Triethanolamine ($C_6H_{15}NO_3$) | 1.00% |
| Corrosion Inhibitor | 1.00% |
| Dye | 0.40% |
| Surfactant | 1.16% |
| Viscosity modifier | 0.60% |
| Water | 18.20% |

An Example 2 final diluted product 503 is prepared by mixing the liquid concentrate 502 of Example 2 with water in a weight ratio concentrate:water of 1.00 to 4.00. According to Example 2 approximately 1 pound of Example 2 502 is mixed with 4 pounds of water to prepare the Example 2 final diluted product 503. The final diluted product 503 of Example 2 may be prepared by mixing the liquid concentrate 502 of Example 2 with water in a volume ratio concentrate:water of about 1.0 to about 2.0 to about 1.0 to about 6.0.

The weight percent of the salt 504, relative to the amount of organophosphate in the composition 500 of Example 2 is about 0% to about 60%, more preferably 5% to 50%, and particularly about 10% to about 40%. For example, the weight percent of the salt, relative to the amount of organophosphate in the composition 500 is about 15% to about 35%, and specifically about 25%.

The weight percent of strong base, relative to the amount of organophosphate in the composition 500 of Example 2 is about 0.05% to about 10%, preferably about 0.1% to about 8%, more preferably about 0.2% to about 6%, and more specifically about 0.3% to about 5%. For example, the weight percent of strong base, relative to the amount of organophosphate in the composition 500, is about 0.4% to about 4.0%, and specifically about 0.64%.

The amounts of the ingredients in the Example 2 final diluted product 503 are listed in Table 4 below. The values in Table 4 can be varied by ~0.1%, ~0.5%, or ~1.0%, or ~1.5%, or ~2%, or ~2.5%, or ~3.0%, or ~3.5%, or ~4.0%, or ~4.5%, or ~5.0%.

TABLE 4

Final Diluted Product according to Example 2

| Ingredient | Weight Percent of Each Ingredient in Wet Concentrate |
|---|---|
| Salt | 5.00% |
| Organophosphate | 10.00% |
| Pigments | 0.40% |
| Magnesium Hydroxide | 0.13% |
| Triethanolamine ($C_6H_{15}NO_3$) | 0.20% |
| Corrosion Inhibitor | 0.20% |
| Dye | 0.08% |
| Surfactant | 0.23% |
| Viscosity modifier | 0.12% |
| Water | 83.64% |

Example 3

Example 3 includes an organophosphate and a salt at a high mix ratio. In Example 3 below, a liquid concentrate 502 is prepared containing the amounts of ingredients listed in Table 5 below. The values in Table 5 can be varied by ~0.1%, ~0.5%, or ~1.0%, or ~1.5%, or ~2%, or ~2.5%, or ~3.0%, or ~3.5%, or ~4.0%, or ~4.5%, or ~5.0%.

TABLE 5

Liquid Concentrate according to Example 3

| Ingredient | Weight Percent of Each Ingredient in Wet Concentrate |
|---|---|
| Salt | 30.00% |
| Organophosphate | 50.00% |
| Pigments | 2.40% |
| Magnesium Hydroxide | 0.77% |
| Triethanolamine ($C_6H_{15}NO_3$) | 1.35% |
| Corrosion Inhibitor | 1.35% |
| Dye | 0.40% |
| Surfactant | 0.50% |
| Viscosity modifier | 0.72% |
| Water | 12.51% |

An Example 3 final diluted product 503 is prepared by mixing the liquid concentrate 502 of Example 3 with water in a weight ratio concentrate:water of 1.00 to 5.00. According to Example 3 approximately 1 pound of Example 3 502 is mixed with 5 pounds of water to prepare the Example 3 final diluted product 503. The final diluted product 503 of Example 3 may be prepared by mixing the liquid concentrate 502 of Example 3 with water in a volume ratio concentrate:water of about 1.0 to about 3.0 to about 1.0 to about 7.0.

The weight percent of the salt 504, relative to the amount of organophosphate in the composition 500 of Example 3 is about 10% to about 80%, more preferably 15% to 75%, and particularly about 20% to about 70%. For example, the weight percent of the salt, relative to the amount of organophosphate in the composition 500 is about 25% to about 60%, and specifically about 50%.

The weight percent of strong base, relative to the amount of organophosphate in the composition 500 of Example 3 is about 0.1% to about 10%, preferably about 0.2% to about 8%, more preferably about 0.3% to about 6%, and more specifically about 0.4% to about 5%. For example, the weight percent of strong base, relative to the amount of organophosphate in the composition 500, is about 0.5% to about 4.0%, and specifically about 0.77%.

The amounts of the ingredients in the Example 3 final diluted product 503 are listed in Table 6 below. The values in Table 6 can be varied by ~0.1%, ~0.5%, or ~1.0%, or ~1.5%, or ~2%, or ~2.5%, or ~3.0%, or ~3.5%, or ~4.0%, or ~4.5%, or ~5.0%.

TABLE 6

Final Diluted Product according to Example 3

| Ingredient | Weight Percent of Each Ingredient in Wet Concentrate |
|---|---|
| Salt | 5.00% |
| Organophosphate | 8.33% |
| Pigments | 0.40% |
| Magnesium Hydroxide | 0.13% |
| Triethanolamine ($C_6H_{15}NO_3$) | 0.23% |
| Corrosion Inhibitor | 0.23% |
| Dye | 0.07% |
| Surfactant | 0.08% |
| Viscosity modifier | 0.12% |
| Water | 85.42% |

Example 4

Example 4 includes an organophosphate and a metal hydroxide and does not include a salt. In Example 4 below, a liquid concentrate 502 is prepared containing the amounts of ingredients listed in Table 7 below. The values in Table 7 can be varied by ~0.1%, ~0.5%, or ~1.0%, or ~1.5%, or ~2%, or ~2.5%, or ~3.0%, or ~3.5%, or ~4.0%, or ~4.5%, or ~5.0%.

TABLE 7

Liquid Concentrate according to Example 4

| Ingredient | Weight Percent of Each Ingredient in Wet Concentrate |
|---|---|
| Salt | 0.00% |
| Organophosphate | 40.00% |
| Pigments | 4.80% |
| Magnesium Hydroxide | 20.00% |
| Triethanolamine ($C_6H_{15}NO_3$) | 0.80% |
| Corrosion Inhibitor | 0.80% |
| Dye | 0.28% |
| Surfactant | 0.10% |

TABLE 7-continued

Liquid Concentrate according to Example 4

| Ingredient | Weight Percent of Each Ingredient in Wet Concentrate |
|---|---|
| Viscosity modifier | 0.60% |
| Water | 32.62% |

An Example 4 final diluted product 503 is prepared by mixing the liquid concentrate 502 of Example 4 with water in a weight ratio concentrate:water of 1.00 to 3.00. According to Example 4 approximately 1 pound of Example 4 502 is mixed with 3 pounds of water to prepare the Example 4 final diluted product 503. The final diluted product 503 of Example 4 may be prepared by mixing the liquid concentrate 502 of Example 4 with water in a volume ratio concentrate:water of about 1.0 to about 1.5 to about 1.0 to about 4.5.

The weight percent of the salt 504, relative to the amount of organophosphate in the composition 500 of Example 4 is about 0%.

The weight percent of strong base, relative to the amount of organophosphate in the composition 500 of Example 4 is about 5% to about 60%, preferably about 10% to about 50%, more preferably about 12% to about 40%, and more specifically about 15% to about 35%. For example, the weight percent of strong base, relative to the amount of organophosphate in the composition 500, is about 15% to about 30%, and specifically about 20%.

The amounts of the ingredients in the Example 4 final diluted product 503 are listed in Table 8 below. The values in Table 8 can be varied by ~0.1%, ~0.5%, or ~1.0%, or ~1.5%, or ~2%, or ~2.5%, or ~3.0%, or ~3.5%, or ~4.0%, or ~4.5%, or ~5.0%.

TABLE 8

Final Diluted Product according to Example 4

| Ingredient | Weight Percent of Each Ingredient in Wet Concentrate |
|---|---|
| Salt | 0.00% |
| Organophosphate | 10.00% |
| Pigments | 1.20% |
| Magnesium Hydroxide | 5.00% |
| Triethanolamine ($C_6H_{15}NO_3$) | 0.20% |
| Corrosion Inhibitor | 0.20% |
| Dye | 0.07% |
| Surfactant | 0.03% |
| Viscosity modifier | 0.15% |
| Water | 83.16% |

Methods of Use

The forest fire retardant compositions of Examples 1 to 4 may be used to suppress, retard, or contain a forest fire. The forest fire retardant compositions of Examples 1 to 4 function as superior forest fire retardants and suppressants compared to the PHOS-CHEK® brand long-term fire retardants (LTR) which have previously been qualified for use by the USFS. A list of the PHOS-CHEK® USFS Qualified long-term fire retardants is given in Table 9.

TABLE 9

List of PHOS-CHEK ® USFS Qualified LTR Products

| USFS Qualified LTR Products List | Description |
| --- | --- |
| PHOS-CHEK ® MVP-Fx | Dry Concentrate, Gum-Thickened, High and Medium Viscosity, High Visibility, Fugitive Color |
| PHOS-CHEK ® MVP-F | Dry Concentrate, Gum-Thickened, High and Medium Viscosity, Standard Fugitive Color |
| PHOS-CHEK ® P100-F | Dry Concentrate, Gum-Thickened, High and Medium Viscosity |
| PHOS-CHEK ® 259-Fx | Dry Concentrate, Gum-thickened, Low Viscosity, High Visibility, Fixed Tank Helicopter Powder Concentrate |
| PHOS-CHEK ® 259-F | Dry Concentrate, Gum-thickened, Low Viscosity |
| PHOS-CHEK ® LC-95A-R | Wet Concentrate, Gum-Thickened, Low Viscosity |
| PHOS-CHEK ® LC-95A-Fx | Wet Concentrate, Gum-Thickened, Low Viscosity, High Visibility, Fugitive Color |
| PHOS-CHEK ® LC-95A-F | Wet Concentrate, Gum-Thickened, Low Viscosity |
| PHOS-CHEK ® LC-95-W | Wet Concentrate, Gum-Thickened, Low Viscosity, Red Iron Oxide, medium Viscosity Liquid Concentrate |

The forest fire retardant compositions of Examples 1 to 4 may contain one, two or more fire-retardant mechanisms of action as a result of the two or more possible fire retardant ingredients, including organophosphate and hydrated salt. The organophosphate reduces the combustion temperature and creates a robust char layer that acts as a physical barrier to combustion. The hydrated salt pulls heat from the fire and produces free water as it dehydrates in the flames.

The organophosphate in the forest fire retardant compositions of Examples 1 to 4 prevent complete combustion of flammable vegetation. Organophosphate reduces the temperature at which the fire burns. Additionally, the organophosphate increases the amount of char residue content. As the organophosphate burns, it releases phosphoric acid, which contributes to the dehydration of the surrounding polymer and vegetation, and results in the formation of a robust char layer at the surface of the vegetation. The robust char layer acts as a physical barrier that blocks heat and oxygen from the flammable surface. The char layer buffers the flammable vegetation from the fire's heat and slows the fire spread.

The hydrated salt in the forest fire retardant compositions of Examples 2 to 4 pull energy out of forest fires at they convert the hydrates of the hydrated salt to free water. For example, the final diluted composition 503 may include magnesium salt hydrate. Once the final diluted composition 503 has dried after application, the magnesium salt hydrate of the composition effectively retards continued combustion. Magnesium hydroxide interferes with the burning process through the release of inter gases (such as water vapor). In this process a protective char layer is formed or the amount of energy available for the spread of fire is reduced through energy absorption. Magnesium salt hydrate is deliquescent, absorbing sufficient moisture from the air to form a liquid solution. Examples 2 to 4 are also self-rehydrating. The larger the difference between the relative humidity of the atmosphere and the critical relative humidity, the faster the water is rehydrated. Generally, the relative humidity on a wildland fire is lowest during the day and recovers during the night. In moderate burning condition, the nighttime relative humidity recovery will rise to 50%-70%. This is an environmental condition that exists almost every night on wildfires, thereby allowing magnesium salt hydrate to absorb moisture from the air and pull it in to the fuel bed leading to its improved forest fire retardant capabilities. The forest fire retardants of Examples 2 to 4 will start to recover water at a lower relative humidity and recover for a longer time every burning period. Calcium salt has a similar retarding efficiency to magnesium salt. Thus, calcium salt has potential use as a long-term liquid fire retardant alone or in combination with magnesium salt. Aluminum hydroxide functions in a similar mechanism to magnesium hydroxide and has potential use as a long-term fire retardant alone or in combination with magnesium hydroxide.

The PHOS-CHEK® LTR products of Table 9 use a similar mechanism to that used by the organophosphate in forest fire retardant 500 to slow the spread of fire. Diammonium phosphate (DAP), an ingredient in PHOS-CHEK® LTR products, can promote the formation of a robust char layer on flammable vegetation that blocks the fire's heat and oxygen to slow the fire spread. In contrast to the forest fire retardant 500, DAP contains ammonium functional groups. Ammonium-functionalized compounds may cause long-term adverse effects in the aquatic environment. Additionally, ammonium-functionalized compounds may release ammonia gas upon combustion. Ammonia gas is acutely toxic to humans and wildlife and may cause burns to the skin and eyes. Additionally, ammonia is very toxic to aquatic organisms. Forest fire retardant 500 is substantially free of any ammonia or ammonium functional groups and is much less toxic to humans and wildlife.

Direct Attack

In a direct attack, the final diluted composition 503 is applied on the fire line. The final diluted composition 503 is a thickened water suppressant which contains water to cool and suppress the fire. For example, when the final diluted composition 503 includes organophosphate, the organophosphate lowers the temperature of the flame front as it burns, releasing phosphoric acid. The organophosphate promotes the formation of a robust char layer that acts as a buffer to further combustion of flammable vegetation. Additionally, if, for example, the final diluted composition 503 includes a magnesium salt hydrate, the water molecules of the magnesium salt hydrate thermally dehydrate in an endothermic reaction, absorbing heat from the fire as the reaction progresses and lowering the temperature of the flame front.

Indirect Attack

In an indirect attack, the final diluted composition 503 is applied in fire containment lines at a significant distance from the fire line. The indirect fire lines are built, and the fire is allowed to burn into them. The long-term fire retardant must be effective even after the water in the composition has evaporated. In an indirect attack, the final diluted composition 503 is applied to vegetation. When the flame front reaches vegetation treated with the final dilute concentration 503, the organophosphate lowers the temperature of the flame front as it burns, releasing phosphoric acid. The organophosphate promotes the formation of a robust char layer that acts as a buffer to further combustion of flammable vegetation. Additionally, if, for example, the final diluted composition 503 includes a magnesium salt hydrate, the final diluted composition 503 is hygroscopic and self-rehydrating. As the water in the final diluted composition 503 evaporates, the salt concentration increases until it reaches its saturation level. When the flame front reaches vegetation treated with the final diluted composition 503, the hydrated water molecules cleave-off in an endothermic reaction, absorbing heat from the fire as the reaction progresses and lowering the temperature of the flame front.

Field Handling and Measurement

The forest fire retardant compositions of Examples 1 to 4 can be delivered to the field either as the dry concentrate 501, liquid concentrate 502, or as the final diluted composition 503. The final diluted composition 503 can be tested prior to application in the field to confirm proper organophosphate content. A refractometer can be used to test the final diluted composition 503. A density measurement can also be used to test the final diluted composition 503. A density of less than 9.1 pounds per gallon may indicate a proper organophosphate content. A pH measurement can also be used to test the final diluted composition 503. A pH of about 6 to about 10 may indicate a proper organophosphate content. A viscosity measurement can also be used to test the final diluted composition 503. A viscosity measurement of about 150 to about 2,500 cP may indicate a proper organophosphate content.

Aerial Application

The final diluted composition 503 may be deposited via aerial application from an airplane or helicopter. The airplane may be a fixed-wing multi-engine aircraft, a fixed-wing single engine airtanker (SEAT), a large airtanker (LAT), a very large airtanker (VLAT), or an unmanned aircraft system (UAS). The helicopter may be a fixed-tank helicopter (HF) or it may be a helicopter bucket (HB). The final diluted composition 503 may be deposited in an indirect attack to build a retardant line before a forest fire or directly to a forest fire via aerial application.

Ground Application

The final diluted composition 503 may be deposited via ground-based equipment, for example via ground application from a truck or ground engine (G). The final diluted composition 503 may be deposited in an indirect attack to build a retardant line before a forest fire or it may be deposited directly to a forest fire via ground application.

Clean Up Procedure

The dry concentrate 501 can be cleaned by broom and/or vacuum. The dry concentrate 501 should be kept dry during cleaning to minimize color staining that may occur when the dye is hydrated. When the dry concentrate 501 is exposed to water, the product can be cleaned with the use of a granular chemical absorbent material, or if proper drainage is available, by rinsing surfaces clean with adequate amounts of water. Dye coloration may be removed from surfaces by treatment with liquid or dry detergent. The final diluted composition 503 can be cleaned with soap or liquid detergent and water. The color of the dye can be neutralized by sodium hypochlorite or washed with liquid detergent.

Conclusion

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

In the claims, as well as in the specification, any ingredient listed in an open-ended list of ingredients shall not be negated or avoided by the addition of water or other solvent or reactant that might cause a chemical change to such ingredient. Thus, for example, even though it is known that an anhydrous salt becomes hydrated in the presence of water, the inventors hereby act as their own lexicographers, so that any composition "including" or "comprising" an "anhydrous" salt is intended to cover both a dry composition substantially free of water in which the salt has substantially no water of hydration, as well as any wet composition formed by the addition of water which causes the anhydrous salt to become hydrated (or to undergo some other change). Both before and after the addition of water or other ingredient, the composition shall be regarded, for purposes of the specification and claims, as comprising an "anhydrous" salt irrespective of any hydration, solvation, or other change caused by the addition of water or other ingredient. The same applies for any ingredient recited in an open-ended list which might be chemically changed by the addition of water or other ingredient to the open-ended list.

The invention claimed is:

1. A forest fire retardant composition, comprising:
   an organophosphate comprising at least one phosphate ester bonded to an organic molecule, wherein the organic molecule comprises at least one monomer unit of about 2 to about 40 carbon atoms;
   a corrosion inhibitor; and
   a surfactant present in the forest fire retardant composition in a weight percent of about 0.02% to about 3% relative to the amount of organophosphate in the forest fire retardant composition;
   wherein the surfactant comprises at least one of sodium dodecyl sulfate (SDS), sodium lauryl sulfate (SLS), sodium 4-dodecylbenzenesulfonate (SDBS), 4-dodecylbenzenesulfonic acid, sodium octyl sulfate, butylnapthalenesulfonic acid sodium salt, or potassium oleate; and
   wherein the composition is substantially free of ammonium; and
   wherein the organophosphate comprises poly(glycerol phosphate)$_n$, where n is about 2 to about 5.

2. The forest fire retardant composition of claim 1, further comprising:
   a salt comprising at least one of magnesium salt, calcium salt, or magnesium calcium salt;
   wherein an anion in the salt comprises at least one of carbonate or phosphate.

3. The forest fire retardant composition of claim 1, further comprising a strong base in the forest fire retardant composition in a weight percent of about 0.05% to about 60% relative to the amount of organophosphate in the forest fire retardant composition.

4. The forest fire retardant composition of claim 1, wherein the corrosion inhibitor inhibits the corrosion of at least one of brass, iron, aluminum, or magnesium.

5. The forest fire retardant composition of claim 1, further comprising a pigment present in the forest fire retardant composition in a weight percent of about 0.25% to about 20% relative to the amount of organophosphate in the forest fire retardant composition.

6. The forest fire retardant composition of claim 1, further comprising a dye present in the forest fire retardant composition in a weight percent of about 0.02% to about 3.0% relative to the amount of organophosphate in the forest fire retardant composition.

7. The forest fire retardant composition of claim 1, further comprising a viscosity modifier present in the forest fire retardant composition in a weight percent of about 0.05% to about 5.0% relative to the amount of organophosphate in the forest fire retardant composition.

8. The forest fire retardant composition of claim 1, further comprising a buffering agent in the forest fire retardant composition in a weight percent of about 0.25% to about 5.0% relative to the amount of organophosphate in the forest fire retardant composition.

9. The forest fire retardant composition of claim 1, further comprising a glow-in-the-dark additive.

10. A forest fire retardant composition, comprising:
    an organophosphate comprising poly(glycerol phosphate)$_n$, where n is about 2 to about 5,
    a corrosion inhibitor to inhibit the corrosion of at least one of iron, brass, or aluminum, present in the composition in an amount having a weight percent of about 0.5% to 4.5% relative to the weight of the organophosphate in the composition;
    a salt comprising at least one of magnesium salt, calcium salt, or magnesium calcium salt, present in the composition in an amount having a weight percent of about 20% to about 80% relative to the weight of the organophosphate in the composition;

a buffering agent, present in the composition in an amount having a weight percent of about 0.25% to about 5.0% relative to the weight of the organophosphate in the composition;

a strong base, present in the composition in an amount having a weight percent of about 0.05% to about 3% relative to the weight of the organophosphate in the composition;

a viscosity modifier, present in the composition in an amount having a weight percent of about 0.05% to about 5.0% relative to the weight of the organophosphate in the composition;

a pigment, present in the composition in an amount having a weight percent of about 0.25% to about 10% relative to the weight of the organophosphate in the composition;

a dye, present in the composition in an amount having a weight percent of about 0.02% to about 3.0% relative to the weight of the organophosphate in the composition; and a surfactant, present in the composition in an amount having a weight percent of about 0.02% to about 3% relative to the weight of the organophosphate in the composition.

11. The forest fire retardant composition of claim 10, wherein:
the corrosion inhibitor comprises one or more azoles;
the buffering agent comprises triethanolamine; and
the pigment comprises titanium dioxide.

12. The forest fire retardant composition of claim 10, wherein the salt comprises at least one of $MgCO_3$, $Mg_3(PO_4)_2$, $Mg_5(CO_3)_4(OH)_2(H_{20})_4$, $Mg_3(PO_4)_2(H_{20})_8$, $CaCO_3$, $Ca_3(PO_4)_2$, $Mg_3Ca(CO_3)_4$, or $Ca_3(PO_4)_2(H_{20})_2$.

13. The forest fire retardant composition of claim 10, wherein:
the composition is in the form of a concentrate further comprising water, wherein:
the water is present in the concentrate in an amount having a weight percent of about 5% to about 70% relative to the total weight of the concentrate; and
the organophosphate is present in the concentrate in an amount having a weight percent of about 15% to about 90% relative to the total weight of the concentrate.

14. A kit comprising:
a sealed container which contains the forest fire retardant composition of claim 13 substantially in the absence of external moisture; and
instructions for using the composition to make a final diluted product useful to suppress, retard, or contain forest fires.

15. A forest fire retardant composition, comprising:
an organophosphate comprising poly(glycerol phosphate)$_n$, where n is about 2 to about 5,
a corrosion inhibitor to inhibit the corrosion of at least one of iron, brass, or aluminum, present in the composition in an amount having a weight percent of about 0.5% to 4.5% relative to the weight of the organophosphate in the composition;
a strong base comprising at least one of magnesium hydroxide or calcium hydroxide, present in the composition in an amount having a weight percent of about 20% to about 60% relative to the weight of the organophosphate in the composition;

a buffering agent, present in the composition in an amount having a weight percent of about 0.25% to about 5.0% relative to the weight of the organophosphate in the composition;

a viscosity modifier, present in the composition in an amount having a weight percent of about 0.05% to about 5.0% relative to the weight of the organophosphate in the composition;

a pigment, present in the composition in an amount having a weight percent of about 0.25% to about 10% relative to the weight of the organophosphate in the composition;

a dye, present in the composition in an amount having a weight percent of about 0.02% to about 3.0% relative to the weight of the organophosphate in the composition; and a surfactant, present in the composition in an amount having a weight percent of about 0.02% to about 3% relative to the weight of the organophosphate in the composition.

16. The forest fire retardant composition of claim 15, wherein:
the corrosion inhibitor comprises one or more azoles;
the buffering agent comprises triethanolamine; and
the pigment comprises titanium dioxide.

17. The forest fire retardant composition of claim 15, wherein:
the composition is in the form of a concentrate further comprising water, wherein:
the water is present in the concentrate in an amount having a weight percent of about 5% to about 70% relative to the total weight of the concentrate; and
the organophosphate is present in the concentrate in an amount having a weight percent of about 15% to about 90% relative to the total weight of the concentrate.

18. A kit comprising:
a sealed container which contains the forest fire retardant composition of claim 17 substantially in the absence of external moisture; and
instructions for using the composition to make a final diluted product useful to suppress, retard, or contain forest fires.

19. A method of manufacturing the forest fire retardant composition of claim 1, the method comprising:
combining the following components to form a forest fire retardant concentrate:
the organophosphate;
the corrosion inhibitor to inhibit the corrosion of at least one of iron, brass, or aluminum, present in the concentrate in an amount having a weight percent of about 0.5% to about 4.5% relative to the weight of the organophosphate in the concentrate; and
the surfactant, present in the concentrate in an amount having a weight percent of about 0.02% to about 3% relative to the weight of the organophosphate in the concentrate;
wherein the step of combining is performed via batch mixing or continuous mixing.

20. The method of claim 19, wherein the components further comprise a salt comprising at least one of magnesium salt, calcium salt, or magnesium calcium salt, present in the composition in an amount having a weight percent of about 20% to about 80% relative to the weight of the organophosphate in the concentrate.

21. The method of claim 19, wherein the corrosion inhibitor comprises one or more azoles.

22. The method of claim 19, wherein the corrosion inhibitor further inhibits the corrosion of magnesium, present in the concentrate in an amount having a weight percent of about 0.5% to about 4.5% relative to the weight of the organophosphate in the concentrate.

23. The method of claim 19, further comprising:

diluting the concentrate with water to form a final diluted product intended for use to suppress, retard, or contain forest fires; or providing instructions for diluting the concentrate to form the final diluted product;

wherein the organophosphate is present in the final diluted product in an amount having a weight percent of about 5% to about 35% relative to the total weight of the final diluted product.

24. The method of claim 19, further comprising:

combining the concentrate with water to form a final diluted product intended for use to suppress, retard, or contain forest fires; or providing instructions for diluting the concentrate to form the final diluted product;

wherein the organophosphate is present in the final diluted product in an amount having a weight percent of about 5% to about 35% relative to the total weight of the final diluted product.

25. A method of combating a forest fire, the method comprising:

depositing, via aerial or ground-based application, the forest fire retardant composition of claim 1;

wherein:

the composition is a final diluted product intended for use to suppress, retard, or contain forest fires;

the step of depositing comprises at least one of a direct attack on the fire or an indirect attack before the fire.

26. The method of claim 25, wherein the step of depositing is performed via aerial application from an airplane or helicopter.

27. The method of claim 25, wherein the step of depositing is performed via ground-based equipment.

28. The method of claim 25, wherein the final diluted product has an organophosphate concentration of about 5% to about 35% by weight.

\* \* \* \* \*

UNITED STATES PATENT AND TRADEMARK OFFICE
CERTIFICATE OF CORRECTION

PATENT NO. : 11,041,063 B2
APPLICATION NO. : 17/031024
DATED : June 22, 2021
INVENTOR(S) : Hulbert et al.

It is certified that error appears in the above-identified patent and that said Letters Patent is hereby corrected as shown below:

In the Claims

- Column 25 In Claim 12, Line 34:
Replace "$Mg_5(CO_3)_4(OH)_2(H_2O)_4, Mg_3(PO_4)_2(H_2O)_8$"
With – $Mg_5(CO_3)_4(OH)_2(H_2O)_4, Mg_3(PO_4)_2(H_2O)_8$ –

- Column 25 In Claim 12, Line 35:
Replace "$Ca_3(PO_4)_2(H_2O)_2$"
With – $Ca_3(PO_4)_2(H_2O)_2$ –

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*